(12) United States Patent
Cawiezel et al.

(10) Patent No.: US 7,303,018 B2
(45) Date of Patent: Dec. 4, 2007

(54) METHOD OF ACIDIZING A SUBTERRANEAN FORMATION WITH DIVERTING FOAM OR FLUID

(75) Inventors: Kay E. Cawiezel, Fulshear, TX (US); Jeffrey C. Dawson, Spring, TX (US)

(73) Assignee: BJ Services Company, Houston, TX (US)

( * ) Notice: Subject to any disclaimer, the term of this patent is extended or adjusted under 35 U.S.C. 154(b) by 313 days.

(21) Appl. No.: 10/888,494

(22) Filed: Jul. 12, 2004

(65) Prior Publication Data

US 2005/0067165 A1 Mar. 31, 2005

Related U.S. Application Data

(60) Provisional application No. 60/489,081, filed on Jul. 22, 2003.

(51) Int. Cl.
*E21B 43/16* (2006.01)
(52) U.S. Cl. .................. 166/307; 166/308.2; 166/308.3; 507/933
(58) Field of Classification Search ................ 166/307, 166/308.2, 308.3; 507/245, 242, 132, 933
See application file for complete search history.

(56) References Cited

U.S. PATENT DOCUMENTS

| | | |
|---|---|---|
| 3,724,549 A | 4/1973 | Dill |
| 4,324,669 A | 4/1982 | Norman et al. |
| 4,591,447 A | 5/1986 | Kubala |
| 4,695,389 A | 9/1987 | Kubala |
| 4,737,296 A * | 4/1988 | Watkins ................ 507/202 |
| 4,960,934 A | 10/1990 | Smith et al. |

(Continued)

FOREIGN PATENT DOCUMENTS

CA 1109356 9/1981

(Continued)

OTHER PUBLICATIONS

Wang, X., et al, "Application of Novel Diversion Acidizing Techniques To Improve Gas Production In Heterogeneous Formation", Presented at the SPE International Symposium on Oilfield Chemistry, Houston, TX, Feb. 5-7, 2003 (SPE 80274).

(Continued)

*Primary Examiner*—William Neuder
*Assistant Examiner*—Nicole A Coy
(74) *Attorney, Agent, or Firm*—Jones & Smith, LLP; John Wilson Jones (57) ABSTRACT

A method of acidizing a subterranean formation with a diverting agent composed of a gelled or thickened viscoelastic foam or fluid generated from (i.) an amidoamine oxide gelling agent and (ii.) an acid or foam, water and/or brine. The gelled or thickened foam or fluid may be generated in-situ or introduced directly into the formation by mixing of the amidoamine oxide gelling agent and acid or foam, water and/or brine. As the acid spends, the acidizing fluid thickens. When the acid is further spent, the fluid viscosity declines eventually returning to a low viscosity state, allowing for easy cleanup. The process allows for selective acidizing of less permeable zones of the formation and more uniform stimulation of the hydrocarbon bearing formation.

51 Claims, 3 Drawing Sheets

U.S. PATENT DOCUMENTS

| | | | |
|---|---|---|---|
| 5,979,552 A | 11/1999 | Michael et al. | |
| 5,979,557 A | 11/1999 | Card et al. | |
| 6,239,183 B1 * | 5/2001 | Farmer et al. | 516/102 |
| 6,258,859 B1 | 7/2001 | Dahayanake et al. | |
| 6,367,548 B1 | 4/2002 | Purvis et al. | |
| 6,399,546 B1 | 6/2002 | Chang et al. | |
| 6,637,517 B2 | 10/2003 | Samuel et al. | |
| 6,729,408 B2 | 5/2004 | Hinkel et al. | |
| 6,903,054 B2 | 6/2005 | Fu et al. | |
| 7,028,775 B2 * | 4/2006 | Fu et al. | 166/308.2 |
| 7,060,661 B2 * | 6/2006 | Dobson et al. | 507/245 |
| 2002/0147114 A1 | 10/2002 | Dobson, Sr. et al. | |
| 2003/0139298 A1 | 7/2003 | Fu et al. | |
| 2005/0209108 A1 | 9/2005 | Fu et al. | |

FOREIGN PATENT DOCUMENTS

| | | |
|---|---|---|
| GB | 2 012 837 A | 8/1979 |
| GB | 2 354 541 A | 3/2001 |
| GB | 2 372 058 A | 8/2002 |
| WO | WO 03/054352 A1 | 7/2003 |
| WO | WO 03/093641 A1 | 11/2003 |

OTHER PUBLICATIONS

Chang, F.F., et al, "Case Study of a Novel Acid-Diversion Technique in Carbonate Reservoirs", Presented at the 1999 Annual Technical Conference and Exhibition, Houston, TX, Oct. 3-6, 1999 (SPE 5652).

* cited by examiner

METHOD OF ACIDIZING A SUBTERRANEAN FORMATION WITH DIVERTING FOAM OR FLUID

This application claims the benefit of U.S. patent application Ser. No. 60/489,081, filed on Jul. 22, 2003.

FIELD OF THE INVENTION

The present invention relates generally to the field of acidizing subterranean formations, including the acidizing of formations of hydrocarbons, such as oil or natural gas, with viscoelastic fluids.

BACKGROUND OF THE INVENTION

Acidizing a hydrocarbon formation is the process of reacting an acid in the formation to enhance the flow of hydrocarbons to the wellbore. This can be through the dissolution of existing formation material or through the removal or bypass of blockage, often referred to as "damage to the well" which can be caused by natural or man-made conditions. Acidizing, or acid stimulation, opens up the channels around the wellbore, thereby improving the flow rate. Early attempts at acidizing formations focused on the injection of a simple acidic solution into a wellbore. Such attempts proved to be inefficient as the fluid would often react or spend too quickly; and therefore be incapable of penetrating deep into the formation, thereby limiting effectiveness to very near-wellbore applications. Also, many subterranean formations contain sections with varying permeability. When acid is injected into a formation, it typically acidizes the section of the formation with the highest permeability and which has the highest degree of water saturation. The acidizing formulations of the prior art lacked a control mechanism to divert or force the acid from the higher permeability and/or water saturated sections of the formation to the lower permeability or oil bearing sections.

Though several alternatives have emerged, they have each failed to precisely control the flow of the acidizing fluid. One such alternative, disclosed in U.S. Patent Application No. 2002/0147114, is directed to the use of a single surfactant system as a gelled acidizing fluid wherein the surfactant gels an acid fluid containing 3-15% HCl solution by volume. Extra energy is often required to pump this already viscous gelled fluid into the well.

Another alternative disclosed in the prior art used N,N,-bis (2-hydroxyethyl) tallow ammonium acetate. Unfortunately, this gelling agent exhibited breakdown at higher temperatures as the acid was spent. Also, this gelling agent gelled too quickly. Therefore, there could not be maximum penetration into the formation. Additionally, the maximum viscosity was too low to adequately perform the necessary diverting.

Additionally, some of the alternatives of the prior art employed crosslinked systems. As such, as the fluid was pumped into the formation, a polymerization reaction occurred which gelled the fluid. These systems left a residue in the formation, which further damaged the formation. Such systems were further dependent upon a sensitive chemical reaction. The polymerization was very difficult to optimize so that it was delayed during pumping but maximized once in the formation. Once these systems were in place, they were difficult to remove. To do so required that they be un-crosslinked.

Other attempts at creating a gelled acidizing fluid have used a multi-surfactant based system. An example of this type of system was described in U.S. Pat. No. 6,399,546. These systems were not desirable for many reasons. First, these systems required mixing of two or more compounds at the well site, which led to quality control issues. The ratio of the ingredients often depended on the temperature and the pH of the system, which further led to quality control issues. Further, the gelling process as described in U.S. Pat. No. 6,399,546 required the introduction of a chemical trigger in order to cause the gelling process.

Therefore, there exists a need to develop an acidizing system that does not rely upon crosslinking for gelation. The viscosity of such acidizing systems should further be capable of being controlled internally. The control of the system should be simple and not based on multiple factors, particularly temperature and chemical triggers. Desirably, the system should be capable of being delayed to allow maximum penetration and further exhibit a high viscosity to adequately divert incoming fluids. The system should further be stable at high temperature while the acid is being spent.

SUMMARY OF THE INVENTION

The present invention involves the use of a diverting stage used in an acidizing treatment. The diverting agent of this stage is composed of a gelled or thickened viscoelastic foam or fluid generated from (i.) an amidoamine oxide gelling agent and (ii.) an acid, water and/or brine, optionally mixed with a gas to form a foam. The amidoamine oxide gelling agent may be neat amidoamine oxide or an amidoamine oxide in a nonaqueous solvent.

The diverting agent is further void of polymers, thereby reducing any potential damage the diverting agent may do to the formation.

One embodiment of the invention relates to a method of acidizing hydrocarbon formations penetrated by a well through the use of a diverting agent wherein the diverting agent is the thickened foam or fluid generated from an amidoamine oxide and an acid. Thus, the diverting agent may be introduced directly to the formation by mixing the amidoamine oxide gelling agent and acid and pumping the resulting viscous fluid to a portion of the formation, thereby inhibiting further flow of fluid to that portion of the formation. In this embodiment of this invention, the amidoamine oxide and an acid are typically admixed for a time sufficient to form the thickened foam or fluid. The thickened or gelled diverter fluid may then be pumped directly to the high permeability zone of the well formation.

In another embodiment, the diverting agent is in-situ generated in the formation. In a preferred embodiment, the amidoamine oxide gelling agent and acid are mixed together and then introduced to a portion of the formation. The gelled diverting fluid is formed in the formation by the interaction of gelling agent and acid as it is spending in the formation, which causes the formation of the more viscous fluid. The acid reacts with the formation lowering the acidity and generating calcium chloride. As the amidoamine oxide and the spent acid and acid reaction products interact, a gel is generated.

The in-situ generated diverting agent is capable of being spread deeper into the formation than diverting agents of the prior art. The gelled or thickened foams or fluids for use in the invention serve as a diverting agent by selectively blocking certain pores temporarily and forcing itself (and subsequent acid stages) into different pores. For example, one could selectively block the higher permeability sections, which then forces the diverting agent itself (and subsequent acid stages) into the lower permeability sections.

In another alternative embodiment of the invention, the amidoamine oxide gelling agent consisting of a thickened foam or fluid of an amidoamine oxide gelling agent and foam, water and/or brine may be introduced directly to the formation. The foam is typically derived from water and nitrogen or carbon dioxide. The acid stage is either introduced prior to or subsequent to the introduction of the diverting agent. Upon contact with the acid, the viscosity of the diverting agent tends to further increase.

Typically, as the acid is spent, it loses acid strength, thereby causing the fluid or foam to become more viscous. The diverting fluid is thickened in the formation by spending of the acid which increases the viscosity of the fluid or foam. It is the reduction in the acidity, along with the accompanying generation of calcium chloride, which is chiefly responsible for the increase in viscosity.

Another embodiment of the present invention relates to selectively acidizing the lower permeable zones of a subterranean formation having a plurality of zones with varying permeabilities by introducing to the well the diverting agent or generating the diverting agent in-situ in the well. The self-diverting fluid is generated in-situ by spending of the acid and generation of the calcium chloride which, in turn, increases the viscosity of the fluid. The gelled or thickened diverting agent diverts a portion of the acid (and subsequent acid stages) from the more permeable zones of the formation to the less permeable zones.

The invention further relates to the use of one or more treatment stages that may be employed either before or after the introduction of the diverting agent to the formation. Such treatment stages include the introduction of an acid, optionally as an emulsified acid; water; nitrogen or carbon dioxide gas; or a mutual solvent, optionally with acid, brine, diesel fuel or water, to the formation.

DETAILED DESCRIPTION OF THE INVENTION

The diverting agent for use in the invention is the thickened foam or fluid which is generated from an amidoamine oxide gelling agent and an acid or an amidoamine oxide gelling agent and foam, water and/or brine.

In a preferred mode, the amidoamine oxide is of the structural formula:

wherein $R_1$ is a saturated or unsaturated, straight or branched chain aliphatic group of from about 7 to about 30 carbon atoms, preferably from about 14 to about 21 carbon atoms. More preferably, $R_1$ is a fatty aliphatic derived from natural fats or oils having an iodine value of from about 1 to about 140, preferably from about 30 to about 90, and more preferably from 40 to about 70. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, tall oil alkyl, hardened tall oil alkyl, coco alkyl, oleyl, or soya alkyl. $R_2$ is a straight chain or branched, substituted or unsubstituted divalent alkylene group of from 2 to about 6 carbon atoms, preferably, of 2 to 4 carbon atoms and more preferably of 3 carbon atoms. $R_3$ and $R_4$ are the same or different and are independently selected from alkyl or hydroxyalkyl groups of from 1 to about 4 carbon atoms and are preferably hydroxyethyl or methyl. Alternatively, $R_3$ and $R_4$ in the amidoamine oxide of formula I, together with the nitrogen atom to which these groups are bonded, form a heterocyclic ring of up to 6 members. Finally, $R_5$ is hydrogen or a $C_1$-$C_4$ alkyl or hydroxyalkyl group.

The amidoamine oxide gelling agent may contain neat amidoamine oxide or amidoamine oxide in a nonaqueous solvent. Suitable nonaqueous solvents include alcohols, glycols, ethers, mineral oils, ketones, aldehydes, esters, amides, etc.

The amine oxide gelling agent can be prepared by reacting a tertiary amine, for example, a tertiary amidoamine, with a concentrated hydrogen peroxide in the miscible solvent. The amount of solvent to be added is determined by the concentration of the amine oxide solution to be prepared.

Preferred solvents employed are high flash point solvents that solubilize the tertiary amine, amine oxide and water from the hydrogen peroxide reagent. If water is used as the solvent, the result is a gel/paste with a maximum amine oxide concentration of 20-30%. If one were to employ an alcohol such as isopropanol as a solvent, then the product will have a low flash point and will have to be classified as a flammable. Also, alcohols such as isopropanol appear to modify the structure of the surfactant aggregates formed thereby negatively affecting the ability of the amine oxide solution to thicken solutions. The use of glycols in accordance with the present invention overcomes the disadvantages of the prior art and allows for the preparation of concentrated amine oxide viscoelastic compositions having a superior thickening ability.

Although any glycol solvent can be employed in accordance with the present invention, the most preferred glycols include but are not limited to ethylene glycol, butylene glycol, diethylene glycol, polypropylene glycol, polyethylene glycol, glycerin, propylene glycol, tetramethylene glycol, tetramethylethylene glycol, trimethylene glycol, and the like. Propylene glycols (e.g., 1,2 propanediol) are the most preferred glycols.

In another preferred embodiment, the amine oxide gelling agent can be prepared by reacting a tertiary amine with a concentrated hydrogen peroxide in an alcohol solvent such as isopropanol but, as mentioned above, since alcohol solvents such as isopropanol may have a deleterious effect on the performance of the gelling agent, it is preferred that the alcohol be removed from the final product and replaced with a glycol solvent.

The amount of amidoamine oxide in the diverting agent is dependent upon the amount of amidoamine oxide in the gelling agent. For example, where neat amidoamine oxide gelling agent is employed, the diverting agent typically contains between from about 0.5 to about 12, preferably from about 1 to about 8, most preferably from about 2 to about 4, volume percent of neat amidoamine oxide gelling agent.

When a nonaqueous solvent is employed, such as a glycol, the amount of amidoamine oxide in the gelling agent is typically between from about 40 to about 65 percent by weight, preferably about 50 percent by weight. The concentration of the gelling agent in the composition is typically between from about 1% to about 20% by volume. More preferably the concentration of the gelling agent should be about 2% to 12% by volume and the most preferred concentration is about 4% to 8% by volume. Such amidoamine oxides gelling agents include those disclosed in US Pat. App. 2002/0147114 A1, herein incorporated by reference, such as those sold under the trade name Aromox APA-T ("APA-T") by Akzo-Nobel.

Other examples of amidoamine oxides useful in the invention include but are not limited to those selected from the group consisting of tallow amidoalkylamine oxide, hardened tallow amidoalkylamine oxide, rapeseed amidoalkylamine oxide, hardened rapeseed amidoalkylamine oxide, tall oil amidoalkylamine oxide, hardened tall oil amidoalkylamine oxide, coco amidoalkylamine oxide, stearyl amidoalkylamine oxide, oleyl amidoalkylamine oxide, soya amidoalkylamine oxide, and mixtures thereof. Preferred specific examples of the amidoamine oxides of the present invention include but are not limited by the following: tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$-$C_{22}$ saturated or unsaturated fatty acid amidopropyl dimethylamine oxides, and mixtures thereof.

The diverting agent may constitute a foam by foaming the amidoamine oxide gelling agent with a foaming agent, such as nitrogen. Further, the foam may be created in-situ by the generation of carbon dioxide from spent acid by reaction of the acid with the rock.

Use of foamed diverting agents reduces the amount of amidoamine oxide surfactant introduced to the formation and thereby reduces the risk of damage to the formation that could possibly result from residual surfactant. In addition, foamed diverting agents are often desirable because they are fairly viscous. Further, use of a foamed diverting agent often reduces the amount of diverting agent actually required for a particular job.

It is also important to minimize the amount of free fatty acid formed since free fatty acid may be harmful to the performance of the gelling agents. More specifically, the gelling agents useful in the invention give greater viscosity to an aqueous solution if the amine oxide has less than 5% free fatty acid, preferably less than 3% free fatty acid, and most preferably, less than 1% free fatty acid. In order to achieve these low levels of free fatty acid, it is important to utilize an oxidation catalyst in the aforementioned process for preparing the gelling agents of the present invention. Preferred oxidation catalysts include, but are not limited to dissolved carbon dioxide, a carbonate salt, a bicarbonate salt and the like. Catalyst systems such as this are described in U.S. Pat. No. 4,960,934 which is incorporated herein by reference.

In a preferred embodiment, the diverting agent consists of amidoamine oxide gelling agent and an acid. The acid used in the diverting agent depends on factors related to the conditions of the formation. The preferred acids are selected from the group consisting of hydrochloric, hydrofluoric, acetic, formic, sulfamic, chloroacetic, and mixtures thereof. The most preferred acid is hydrochloric acid in carbonate-based formations and hydrochloric acid and hydrofluoric acid mixtures for sandstone formations.

The amount of aqueous acid in the diverting agent is typically between from 80 to about 99 volume percent and the strength of the acid is generally greater than or equal to 10%. Typically, when it is desired to introduce the gelled thickened foam or fluid into the formation, the strength of the acid is typically between from about 10 to about 15%. When the diverting agent is to be generated in-situ such as when a low viscosity fluid is to be introduced into the formation, the strength of the acid is typically between from about 20 to about 28%. The acid reacting, with the carbonate rock, lowers the acid strength to a concentration less than 15% which causes gellation to occur.

The viscosity of the gelled thickened foam or fluid directly introduced into the formation is typically between from about 300 to about 4,000 cP at room temperature at 10 rpm or a shear rate of about 17 sec$^{-1}$. Where the diverter agent is to be generated in-situ, the initial viscosity of the system should be low, such as below about 100 cP at 10 rpm or a shear rate of about 17 sec$^{-1}$. Preferably the initial viscosity should be between about 1 and about 90 cP at shear rate of about 17 sec$^{-1}$. In order to create these types of viscosities in this system, the acid introduced to the gelling agent should be at a strength set forth in the paragraph above.

The compositions of the invention may further contain additional additives that may affect the gelling process. These additives include corrosion inhibitors and intensifiers. The purpose of these additives is to reduce the corrosive effects that the acids may have on the well tubulars. Although the introduction of corrosion inhibitors has been shown to reduce the maximum attainable viscosity of the system, the inhibitors should not have an effect on the system in terms of its gelling and its behavior as a diverting agent.

Corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized carboxylic acids (e.g., 4-(t-butyl)-benzoic acid and formic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

In a particularly preferred embodiment of the invention, the diverting agent is a self-diverting acid fluid. The acid fluid may be initially thin when pumped into the formation. As the acid reacts in a carbonate formation, the viscosity increases. The acid primarily enters the high permeability zone. As the acid spends, the acid system gels, selectively reducing the flow to the more permeable zone of the formation, thereby diverting the acid to lower permeability areas. The diversion from high to low permeability zones of the formation is attributable to the change in viscosity during the course of the treatment. In light of such diversion, larger sections of the formation may be acidized effectively. Hydrocarbon contacting the fluid during flowback, or complete spending of the acid, will break the gel.

Figure 1:
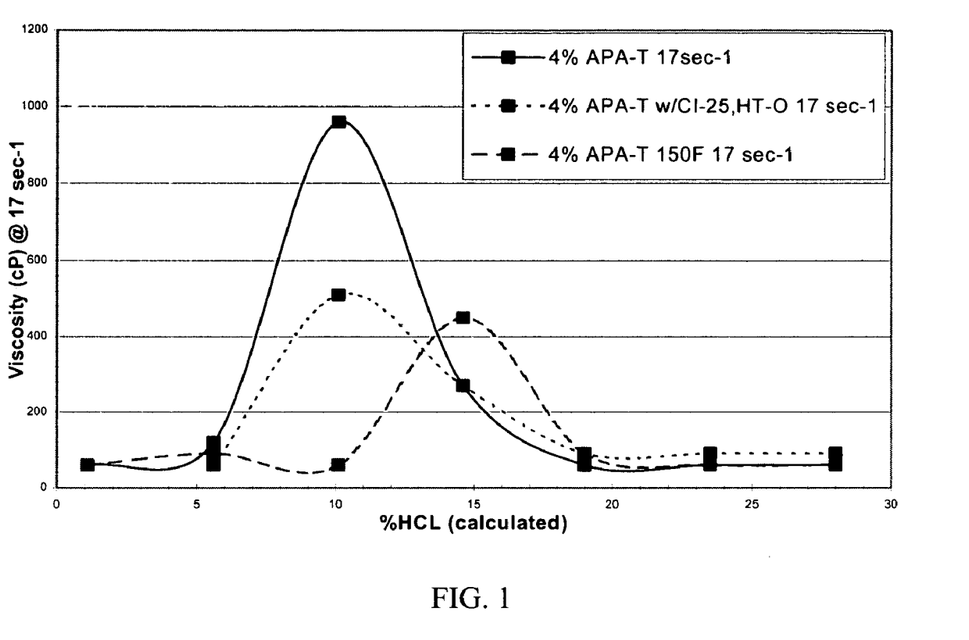
FIG. 1 is a graph depicting the viscosity of the acidizing fluid relative to the concentration of acid.

That a high viscosity fluid may be created by reaction of acid and carbonate is demonstrated by the results shown in FIG. 1. As depicted in FIG. 1, the initial viscosity of the fluid is below about 100 cP. As disclosed the preferred viscosity is below 90 cP at a shear rate of 17 sec$^{-1}$. This means that when the acid fluid is pumped into the formation, there is a reduction in effort associated with the operation. In contrast, many diverting agents are highly viscous in their initial state. While this may work well within the formation, it makes it difficult to pump the fluid initially, particularly in lower permeability regions of the formation.

Once in the formation, the low viscosity fluid gels upon reaction or spending of the acid. The corresponding increase in viscosity is due to a decrease in acid concentration and the presence of calcium chloride generated from the reaction of acid and calcium carbonate in the formation. Thus, the gelation process is based upon the spending of the acid. No additional products or chemical triggers are required to be pumped into the formation. This simplifies the treatment and eliminates the need for other products that could possibly damage the formation.

Another advantage of the method of the invention is that the gelling of the low viscosity fluid in the hydrocarbon formation is based on the single reaction of the acid with the surroundings. It is therefore much easier to control the system. It is also much easier to predict when diversion occurs from pressure changes observed at the surface.

In addition to the in-situ diverting process, the amidoamine oxide and acid having suitable acid strength can be gelled on mixing and pumped as a viscous diverting stage. The amidoamine oxide is mixed with a sufficient concentration of acid so as to create a high viscosity acid. The high viscosity diverting agent is preferably the thickened foam or fluid which forms from the amidoamine oxide gelling agent and acid, as set forth above. The gelling or thickening process, forming the gelled or thickened foam or fluid, does not depend on the use or introduction of chemical triggers.

The thickened foam or fluid may be derived from a mineral acid as well as an organic acid, including HCl, HF, acetic, formic, sulfamic, chloroacetic as well as mixtures thereof. Typically, acid added to 1 to 20% by volume amidoamine oxide gelling agent is between an equivalent of 10 to 15 percent by weight hydrochloric acid. Most typically, the amidoamine oxide gelling agent ranges between from about 4 to about 8% by volume (as 50% active gelling agent) in nonaqueous solvent. By sequential injection, the thickened amidoamine oxide upon reaching the high permeability zone, reduces fluid flow to that portion of the formation, thereby forcing additional flow to lower permeability zones.

The acid need not, however, be admixed with the amidoamine oxide prior to injection of the amidoamine oxide gelling agent into the formation. In an embodiment of the invention, the diverting agent may be first introduced into the formation either before or after the introduction of the acid stage.

Formations having multiple permeability intervals typically require a series of distinct treatment stages in order to stimulate selected intervals without stimulating undesired areas. Thus, it is often desirable to include one or more treatment stages either before or after the introduction of the diverting agent into the formation.

These treatment stages include the introduction of an acid, including emulsified acid, optionally with a mutual solvent; water; nitrogen or carbon dioxide gas; or a mutual solvent, optionally with acid, brine, diesel fuel or water, to the formation. The emulsified acid is preferably an oil-external emulsion prepared by mixing a strong acid, such as HCl, with diesel at 70:30 volume ratio under high shear rates. An emulsifier is incorporated in the system that is specific for reservoir temperatures. The mutual solvent is defined to be any chemically mutually soluble solvent in hydrocarbons and water, such as glycol ethers and in particular ethylene glycol monobutylether, etc.

Such treatment stages may be used in any combination either before or after the introduction of the diverting agent. They may be used before or after the introduction of the acid to the formation.

Further, the treatment stages may be used in any order in accordance with the needs of the operator and the job being performed. For instance, it may be necessary for the operator to perform two successive emulsified acid stages after introduction of the diverting agent to the formation.

The mutual solvent, optionally with diesel, can be key to breaking the viscosity of the gel in the formation, thereby eliminating the need to flow back the well following the acid treatment. In addition, mutual solvents are useful in cleaning of the formation face to further the interaction between the formation face and the acid itself. The water phase, as well as brine, can further serve as a spacer to separate the amidoamine oxide gelling agent from the mutual solvent. Further, water stages can serve as a displacement stage at the end of the treatment. Nitrogen and carbon dioxide gas are further useful for displacement. Emulsified acid is especially effective in obtaining deep acid penetration in the well.

Exemplary protocols for job designs may include any of the following:

Protocol A:

| | |
|---|---|
| Step 1 | Amidoamine oxide/Water Foamed with Nitrogen |
| Step 2 | Emulsified Acid |
| Step 3 | Amidoamine oxide + 20% Acid |

Protocol B:

| | |
|---|---|
| Step 1 | Acid + Mutual Solvent |
| Step 2 | 20% HCl |
| Step 3 | Amidoamine oxide + 20% HCl |
| Step 4 | 20% HCl |
| Step 5 | 20% HCl + Mutual Solvent |
| Step 6 | Diesel + Mutual Solvent |
| | Repeat Steps 3 and 4, as needed |

Protocol C:

| | |
|---|---|
| Step 1 | 20% HCl |
| Step 2 | Water |
| Step 3 | Amidoamine oxide Water/Brine |
| Step 4 | Emulsified Acid |
| Step 5 | Amidoamine oxide Water/Brine |
| Step 6 | Amidoamine oxide + 20% Acid |
| Step 7 | Water + Mutual Solvent |
| Step 8 | 20% HCl |
| Step 9 | HCl Overflush |
| | Repeat Steps 3 and 4, as required |

Protocol D:

| | |
|---|---|
| Step 1 | 3% Amidoamine oxide + Water + Nitrogen |
| Step 2 | 20% HCl |
| | Repeat Steps 1 and 2, as needed |
| Step 3 | Water + Mutual Solvent Flush |

Protocol E:

| | |
|---|---|
| Step 1 | Water |
| Step 2 | 20% HCl |
| Step 3 | Amidoamine oxide + Water + Nitrogen |
| Step 4 | 20% HCl |

-continued

| Step 5 | 20% Emulsified Acid |
| Step 6 | Diesel/Mutual Solvent flush |
| | Repeat Steps 3-5, as needed |

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

All percentages expressed herein, unless indicated to the contrary, refer to volume percentages. Acid strengths or concentrations are presented as percent acid by weight. The following abbreviations are used in the examples that follow:

APA-T refers to Aromox® APA-T, a gelling agent composed of tallowamidopropyldimethylamine oxide in glycol, available from Akzo Nobel Surface chemistry LLC, Chicago, Ill. APA-T contains about 50 percent by weight of amine oxide.

CI-25 refers to an organic corrosion inhibitor. It provides effective protection of tubulars and downhole equipment in bottomhole temperatures up to 250° F.

HY-TEMP O refers to an organic corrosion inhibitor intensifier. When used with CI-25, it can provide protection at temperatures in excess of 325° F.

EXAMPLE 1

Acid Spending Test 15 ml. of APA-T were introduced to 250 ml of 28% HCl on a stirring plate. The temperature was maintained at ambient. To the mixture was added calcium carbonate in 17.5 grams increments. The calcium chloride was added slowly to the acid to minimize bubbling of the fluid. After the addition of each increment the resulting mixture was then transferred to a Chandler 3500 viscometer having an R1B1 bob and cup assembly. The viscosity was then measured at 300 rpm (511 $sec^{-1}$), as was the amount of calculated acid in the mixture. The results are set forth in Table I:

TABLE I

| No. of Calcium Carbonate Increments | Viscosity @ 511 $sec^{-1}$, cP | Acid Concentration, Volume % |
|---|---|---|
| 0 | 2 | 28 |
| 1 | 2 | 24 |
| 2 | 18 | 19 |
| 3 | 54 | 15 |
| 4 | 165 | 10.6 |
| 5 | 13 | 6 |

The results establish that APA-T exhibits acid spending behavior required by diverting agents. The low initial viscosity allows the acid to be easily pumped into cores with the acid being spent as the viscosity of the composition increases. Thus, when the acid enters the high permeability core, it develops high viscosity as the acid spends. It will then have higher viscosity than the acid still in the injection lines. The acid chooses the path of least resistance, thus the lower permeability sections of the formation.

EXAMPLE 2

Acid Spending Test

A 250 ml solution containing 4% (by volume) APA-T and 28% HCl was prepared at ambient temperature. In addition, a solution containing 4% (by volume) APA-T with 10 gpt CI-25 and 10 gpt HY-TEMP O was also prepared at ambient temperature. (The term "gpt" refers to gallons per 1000 gallons of fluid and cP refers to the viscosity units of centipoise.)

The viscosity was then measured by a Chandler 3500 viscometer at 10 rpm or a shear rate of 17 $sec^{-1}$. The results, illustrated in FIG. 1, show that the initial viscosity of the mixture is low, allowing the acid to be easily pumped into the formation.

At ambient temperature, the amidoamine oxide in 28% hydrochloric acid has an initial viscosity of approximately 60 cP. The fluid viscosity increases to 270 and 960 cP as the acid spends to 15% and 10% acid, respectively.

The amidoamine oxide in 28% hydrochloric acid with 10 gpt of a corrosion inhibitor and 10 gpt of an intensifier exhibited an initial viscosity of 90 cP at a shear rate of 17 $sec^{-1}$. The fluid viscosity increased to 270 and 510 as the acid spends to 15% and to 10% acid concentrations, respectively. The fluid viscosity then decreases sharply below 10% acid concentration.

Further, at 150° F. the amidoamine oxide in 28% hydrochloric acid has an initial viscosity of 60 cP at a shear rate of 17 $sec^{-1}$. The fluid viscosity increases to 450 cP as the acid spends to 15% acid. The fluid viscosity then decreases sharply below 10%. At about 5% acid, the fluid has returned to its original low viscosity. The system is self-contained, and the change in acid concentration controls the viscosity of the system. This final step allows for the easy clean up of the system after acidizing. The clean up is effectuated during flowback because the formation water and hydrocarbons will break the gel and carry the fluid to the well.

FIG. 1 therefore establishes that the amidoamine oxide when added to a concentrated acid maintains low viscosity initially which allows the acid to be easily pumped. As the acid spends, the viscosity of the acid increases to a maximum and then decreases as the acid spends further. The acid concentration at which the acid has a viscosity maximum varies depending on the concentration of the surfactant, temperature and other additives being present. A two-fold decrease in the maximum viscosity is seen with an APA-T mixture at 75° F. containing a corrosion inhibitor and a corrosion inhibitor intensifier versus the APA-T mixture at 75° F. void of such additives. Further, a two-fold decrease in the maximum viscosity is seen with an APA-T mixture at 150° F. versus 75° F.

EXAMPLE NOS. 3-6

Core Diversion Test

Two core pairs were treated using two different diversion systems. The system in Example Nos. 3 and 4 contained 28% HCl, 4% APA-T, 10 gpt of CI-25 and 10 gpt of Hy Temp O. The system in Example Nos. 5 and 6 contained 28% HCl, 8% APA-T, 10 gpt of CI-25 and 10 gpt of Hy Temp O.

The diverting acids of Examples 3 and 4 and of Examples 5 and 6 were pumped simultaneously through two cores having different permeabilities, placed in parallel. The fluid was pumped at a constant rate and the test was continued until the acid penetrated through one of the cores, causing a significant filtrate rate increase. The core diversion testing of Examples 3 and 4 was conducted at 150° F., and the testing of Examples 5 and 6 was conducted at 220° F. The amidoamine oxide gelled acid solution produced wormholes (flow channels created by acidizing) that channeled all the way through the core in one core of the pair, while the lower permeability core had a higher regained permeability than the high permeability core—showing excellent stimulation of the lower permeability core. The results of the core testing are given in Table II below:

TABLE II

| Example Number | Diversion System | Initial Permeability (md) | Regained Permeability (md) |
|---|---|---|---|
| 3 | APA-T 4% | 38 | 3007 |
| 4 | APA-T 4% | 68 | 2644 |
| 5 | APA-T 8% | 40 | 5615 |
| 6 | APA-T 8% | 46.5 | 663 |

Figure 2:
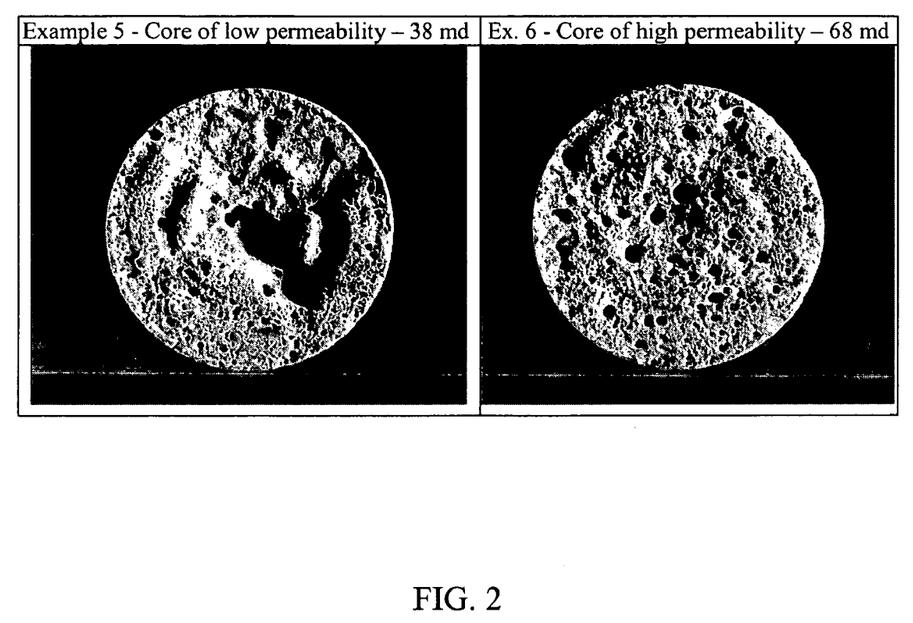
FIG. 2 pictorially depicts the results of core diversion tests using an exemplary acidizing fluid.

The cores of Examples 3 and 4 had initial permeabilities to liquid of 38 and 68 md, respectively. After pumping the acid fluid, the cores of Examples 3 and 4 had regained permeabilities of 3007 and 2644 md, respectively. The increase in permeability in the core of Example 3 from 38 to 3007 md shows significant stimulation in the lower permeability formation. The photograph in FIG. 2 shows multiple wormholes in the cores of Examples 3 and 4. The photograph in FIG. 2 is approximately two times actual size.

The results further indicate that the cores treated with Examples 5 and 6 had initial permeabilities to liquid of 40 and 46.5 md, respectively. The cores of Examples 5 and 6 had regained permeabilities of 5615 and 663 md after treatment, respectively. The high regained permeability demonstrates significant stimulation was achieved in both cores. The increase in permeability of the core of Example 5 from 40 to 5615 shows significant stimulation in the lower permeability rock.

EXAMPLE NOS. 7-8

Core Diversion Test

The preferred system demonstrated by Examples Nos. 3 and 4 was compared to a system of the prior art to show the improved performance of the preferred system. Two cores were treated using a system of the prior art. The system in Example Nos. 7 and 8 contained 28% HCl, 6.6% zwitterionic surfactant, 10 gpt of CI-25 and 10 gpt of HY-TEMP O. The diverting acids of Examples 7 and 8 were tested using the same procedure as that used for the testing of Examples 3 and 4. The core diversion testing of Examples 7 and 8 was conducted at 150° F. The regained permeability measurements showed that the lower permeability core had only a two-fold increase in permeability and the higher permeability core had infinite permeability. This indicates that there was little stimulation in the low permeability core and a single dominant flow channel created in the high permeability core. The results of the core testing are given in Table III below:

TABLE III

Results of Core Diversion Testing at 150° F.

| Example Number | Diversion System | Initial Permeability (md) | Regained Permeability (md) |
|---|---|---|---|
| 7 | Zwitterionic 6.6% | 32 | 68 |
| 8 | Zwitterionic 6.6% | 51 | infinite |

EXAMPLE NO. 9

Acid Thickening Test 20 ml. of APA-T were introduced to 250 ml of 20% HCl on a stirring plate and mixed for one hour. The temperature was maintained at ambient. The resulting mixture was then transferred to a Chandler 35 viscometer cup. The viscosity was then measured at rates ranging from 1 rpm (1.7 sec$^{-1}$) to 300 rpm (511 sec$^{-1}$). The test was then repeated with 15% HCl, 10% HCl, 5.7% HCl and 3% HCl. The results are set forth in FIG. 3.

Figure 3:
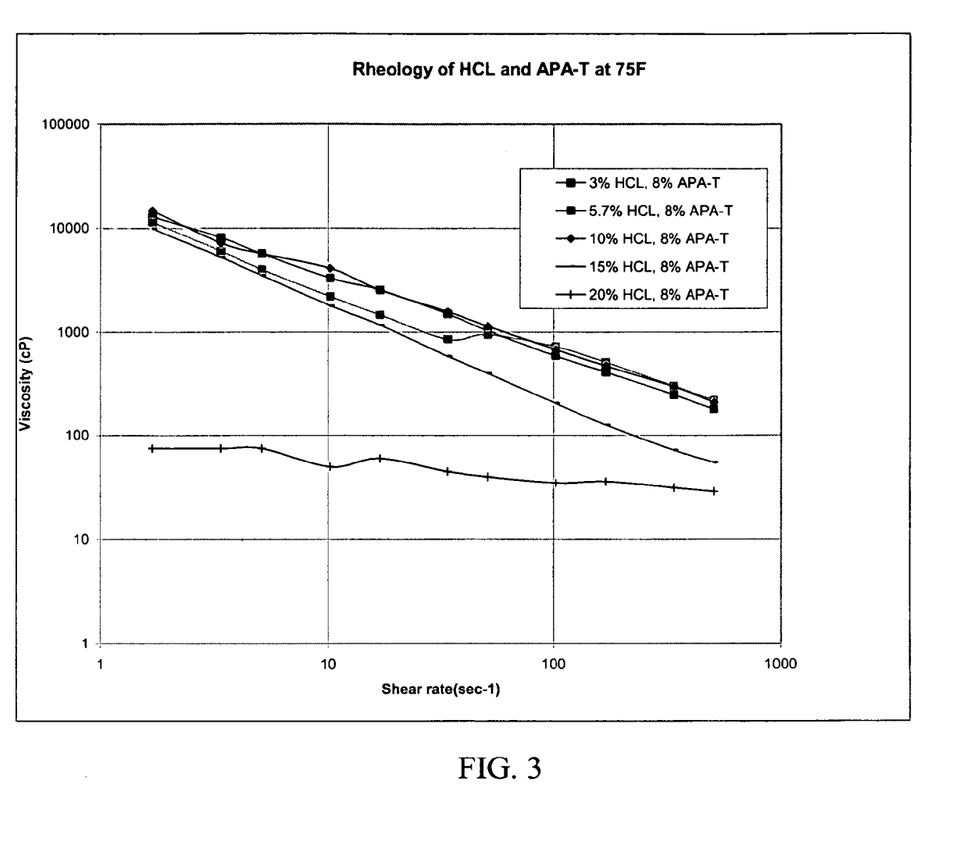
FIG. 3 is a graph depicting the viscosity of the acidizing fluid relative to shear rate.

The results indicate that at the stated HCl concentrations, APA-T develops sufficient viscosity for use as a thickened acid gelling agent for diversion. The high viscosity acid gels on mixing. The thickened acid pumped enters the high permeability zones, reduces fluid flow to that portion of the formation, thereby forcing the following acid fluid to lower permeability zones.

EXAMPLE 10

Field Test Using Successive Stimulation Stages

A foamed APA-T solution was prepared by admixing a 30% by volume of a 3% to volume APA-T solution (prepared by mixing 30 gallons of APA-T with 970 gallons of water) to 70% by volume of metered nitrogen.

To a water injection wellbore having a depth of 9600 feet, was introduced a coiling by 50 to 75 feet per minute while pumping water 0.25 barrel per minute (bpm) to 7,860 feet (approximately 2,000 gallons). Water was then pumped at 2 to 3 gallons per square foot while running the coil tubing out the horizontal open hole to the maximum depth, or about 9,600 feet, reached for hole clean out, not exceeding 30 ft/min. The wing valve was then opened and the pumping of twelve stages of foamed APA-T and 20% HCl, as set forth in Table III below, was then commenced. The coiled tubing was pulled upwards as each of the stages was injected:

TABLE III

| Stage | Fluid Description | Volume (gal) |
|---|---|---|
| 1 | APA-T Foam | 900 |
| 2 | Stimulation - 20% HCl | 10,000 |
| 3 | APA-T Foam | 750 |
| 4 | Stimulation - 20% HCl | 10,000 |
| 5 | APA-T Foam | 750 |
| 6 | Stimulation - 20% HCl | 10,000 |
| 7 | APA-T Foam | 750 |
| 8 | Stimulation - 20% HCl | 10,000 |
| 9 | APA-T Foam | 750 |
| 10 | Stimulation - 20% HCl | 10,000 |
| 11 | APA-T Foam | 750 |

TABLE III-continued

| Stage | Fluid Description | Volume (gal) |
|---|---|---|
| 12 | Stimulation - 20% HCl | 7,600 |
| 13 | Water (Displace Acid Out of the CTU) | 2,500 |

There was no lag between in between the successive treatments. Stimulation using the APA-T started with 17,000 barrels of water per day that they could inject before stimulation. After stimulation, they could inject 80K barrels of water a day.

EXAMPLE 11

Field Test

In field uses of the thickened acid diverting agent, the diverting agent is thickened on the surface and pumped in between straight, as well as gelled, acid stimulation stages. One stimulation diverter stage is used per set of perforations. Some treatments may treat four to five zones that are perforated; thus four to five diverting stages are used. An exemplary treatment is done in the following stages:
15% HCl for tubing pickling;
15% HCl breakdown acid or preflush, 25 gal/ft;
15% HCl straight or gelled (stimulation stage), 50 gal/ft;
15% HCl with 4% Aromox APA-T (diverting stage), 20 gal/ft;
repeat stimulation stage, followed by diverting stage for each set of perforations;
final displacement with 5% mutual solvent in diesel or brine.

From the foregoing, it will be observed that numerous variations and modifications may be effected without departing from the true spirit and scope of the novel concepts of the invention.

What is claimed is:

1. A method for stimulating a carbonate formation penetrated by a well with a diverting agent of a gelled or thickened foam or fluid, the method comprising:
   (A.) introducing into the well either:
      (i.) a diverting agent of a gelled or thickened foam or fluid formed from an amidoamine oxide gelling agent and an acid, water and/or brine, and, optionally a gas; or
      (ii.) an amidoamine oxide gelling agent and an acid, water and/or brine and, optionally a gas, which, subsequent to introduction into the well, forms a diverting agent of a gelled or thickened foam or fluid in-situ in the formation; and
   (B.) introducing an acid stage into the well prior to and/or subsequent to introduction of the diverting agent of (A.)(i.) or the amidoamine oxide gelling agent and acid, water and/or brine and optional gas of (A.)(ii.)
wherein the diverting agent diverts the flow of the acid stage from high permeability portions of the formation to low permeability portions of the formation and further wherein the amidoamine oxide gelling agent comprises amidoamine oxide neat or amidoamine oxide in a nonaqueous solvent.

2. The method of claim 1, wherein the acid which forms the diverting agent is selected from the group consisting of hydrochloric, hydrofluoric, acetic, formic, sulfamic, chloroacetic acid, and mixtures thereof.

3. The method of claim 2, wherein the acid which forms the diverting agent is hydrochloric acid.

4. The method of claim 1, wherein the amidoamine oxide of the amidoamine oxide gelling agent is of the formula:

wherein $R_1$ is a saturated or unsaturated, straight or branched chain aliphatic group of from about 7 to about 30 carbon atoms, $R_2$ is a straight chain or branched, substituted or unsubstituted divalent alkylene group of from 2 to about 6 carbon atoms, $R_3$ and $R_4$ are independently selected from alkyl or hydroxyalkyl groups of from 1 to about 4 carbon atoms or $R_3$ and $R_4$ together with the nitrogen atom to which these groups are bonded form a heterocyclic ring of up to 6 members;
and $R_5$ is hydrogen or a $C_1$-$C_4$ alkyl or hydroxyalkyl group.

5. The method of claim 4, wherein $R_1$ is a saturated or unsaturated, straight or branched chain aliphatic group of from about 14 to about 21 carbon atoms.

6. The method of claim 4, wherein $R_1$ is a fatty aliphatic derived from natural fats or oils having an iodine value of from about 40 to about 70.

7. The method of claim 4, wherein $R_2$ is a straight chain or branched, substituted or unsubstituted divalent alkylene group of from 2 to 4 carbon atoms.

8. The method of claim 7, wherein $R_2$ is a straight chain or branched, substituted or unsubstituted divalent alkylene group of 3 carbon atoms.

9. The method of claim 4, wherein $R_3$ and $R_4$ are the same or different and are independently selected from hydroxyethyl or methyl.

10. The method of claim 1, wherein the amount of amidoamine oxide gelling agent in the diverting agent is between from about 0.5 to about 12 volume percent based on neat amidoamine oxide.

11. The method of claim 1, wherein the amidoamine oxide gelling agent contains an amidoamine oxide selected from the group consisting of tallow amidoalkylamine oxide, hardened tallow amidoalkylamine oxide, rapeseed amidoalkylamine oxide, hardened rapeseed amidoalkylamine oxide, tall oil amidoalkylamine oxide, hardened tall oil amidoalkylamine oxide, coco amidoalkylamine oxide, stearyl amidoalkylamine oxide, oleyl amidoalkylamine oxide, soya amidoalkylamine oxide, and mixtures thereof.

12. The method of claim 1, wherein the amidoamine oxide gelling agent contains an amidoamine oxide selected from tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$-$C_{22}$ saturated or unsaturated fatty acid amidopropyl dimethylamine oxides, and mixtures thereof.

13. The method of claim 1, wherein the viscosity of the diverting agent is increased by spending of the acid in the formation, thereby diverting the acid stage into less permeable zones of the formation.

14. The method of claim 1, wherein the diverting agent further comprises a corrosion inhibitor, a corrosion inhibitor intensifier, or a combination thereof.

15. The method of claim 1, wherein at least one of the following additional stages is introduced into the well prior to and/or subsequent to (A.)(i) or (A.)(ii):
   (a.) water;
   (b.) nitrogen or carbon dioxide gas; or
   (c.) mutual solvent optionally with acid, brine, diesel fuel or water.

16. The method of claim 15, wherein at least two of said additional stages are separately introduced into the well, the composition of the two additional stages being the same.

17. The method of claim 1, wherein:
   (a.) the diverting agent is generated by creating a viscous fluid by mixing an amidoamine oxide gelling agent and an acid; and
   (b.) the viscous fluid of step (a) is pumped to a portion of the formation, thereby inhibiting further fluid flow to said portion of the formation.

18. The method of claim 1, wherein the diverting agent is introduced directly to the well.

19. The method of claim 18, wherein the diverting agent is formed from no greater than 15% by weight of acid.

20. The method of claim 1, wherein the diverting agent is formed from an amidoamine oxide gelling agent and foam, water and/or brine.

21. The method of claim 1, wherein the diverting agent is generated in-situ.

22. The method of claim 21, wherein the diverting agent is generated in-situ by:
   (a.) creating a low viscosity fluid by mixing an amidoamine oxide gelling agent and an acid and pumping the low viscosity fluid into a portion of the formation; and
   (b) gelling the low viscosity fluid therein to form the thickened foam or fluid in a portion of the formation, thereby preventing further fluid flow into said portion of the formation.

23. The method of claim 22, wherein the low viscosity fluid resulting from step (a.) has a viscosity below 100 cp at a shear rate of 17 sec$^{-1}$.

24. The method of claim 22, wherein the acid is selected from the group consisting of hydrochloric, hydrofluoric, acetic, formic, sulfamic, chloroacetic acid and mixtures thereof.

25. The method of claim 24, wherein the acid is hydrochloric acid.

26. The method of claim 22, wherein the viscosity of the diverting agent is increased by spending of the acid in the formation, thereby diverting subsequently introduced acid into less permeable zones of the formation.

27. The method of claim 26, wherein the diverting agent has the property of developing viscosity on spending of the acid that increases to a maximum and then decreases as the acid spends further.

28. The method of claim 21, wherein the gelled or thickened fawn or fluid is generated from the spending of between from about 20 to about 28% by weight of acid.

29. The method of claim 1, wherein the diverting agent is generated in-situ as a thickened foam and further wherein the gas is created in-situ by the generation of carbon dioxide from spent acid.

30. The method of claim 1, wherein the amine oxide has less than about 5% free fatty acid.

31. The method of claim 30, wherein the amine oxide has less than about 3% free fatty acid.

32. The method of claim 31, wherein the amine oxide has less than about 1% free fatty acid.

33. The method of claim 1, wherein the amidoamine oxide gelling agent comprises amidoamine oxide neat and further wherein the diverting agent comprises between from about 1 to about 8 volume percent of neat amidoamine oxide galling agent.

34. The method of claim 33, wherein the diverting agent comprises between from about 2 to about 4 volume percent of neat amidoamine oxide gelling agent.

35. The method of claim 1, wherein the diverting agent comprises between from about 40 to 65 weight percent of amidoamine oxide in a nonaqueous solvent.

36. The method of claim 1, wherein the amidoamine oxide gelling agent comprises amidoamine oxide in a nonaqueous solvent and further wherein the concentration of the gelling agent in the diverting agent is between from about 1 to about 20 volume percent.

37. The method of claim 36, wherein the concentration of the gelling agent in the diverting agent is between from about 2 to about 12 volume percent.

38. The method of claim 37, wherein the concentration of the gelling agent in the diverting agent is between from about 4 to about 8 volume percent.

39. The method of claim 1, wherein the amidoamine oxide gelling agent contains at least one glycol.

40. The method of claim 39, wherein the at least one glycol is selected from the group consisting of ethylene glycol, butylenes glycol, diethylene glycol, polypropylene glycol, polyethylene glycol, glycerin, propylene glycol, tetramethylene glycol, tetramethylethylene glycol and trimethylene glycol.

41. The method of claim 1, wherein the acid stage contains an emulsified acid.

42. A method for stimulating a formation penetrated by a well with a diverting agent of a gelled or thickened foam or fluid, the method comprising:
   (A.) introducing into the well an amidoamine oxide gelling agent and an acid, water and/or brine, optionally mixed with a, gas, wherein the amidoamine oxide gelling agent is of the formula:

wherein $R_1$ is a saturated or unsaturated, straight or branched chain aliphatic group of from about 7 to about 30 carbon atoms, $R_2$ is a straight chain or branched, substituted or unsubstituted divalent alkylene group of from 2 to about 6 carbon atoms, $R_3$ and $R_4$ are independently selected from alkyl or hydroxyalkyl groups of from 1 to about 4 carbon atoms or $R_3$ and $R_4$ together with the nitrogen atom to which these groups are bonded form a heterocyclic ring of up to 6 members; and $R_5$ is hydrogen or a $C_1$-$C_4$ alkyl or hydroxyalkyl group and further wherein the amidoamine oxide gelling agent and acid, water or brine and, optionally, gas forms a diverting agent of a gelled or thickened fluid or foam; and
   (B.) introducing an acid stage into the well either prior to or subsequent to the formation of the gelled or thickened fluid or foam,
wherein the diverting agent diverts the flow of the acid stage from high permeability portions of the formation to low permeability portions of the formation and further wherein the amidoamine oxide gelling agent comprises amidoamine oxide neat or amidoamine oxide in a nonaqueous solvent.

43. The method of claim 42, further comprising introducing into the well, either prior to and/or subsequent to (A.) at least one treatment agent selected from the group consisting of water, nitrogen, carbon dioxide and a mutual solvent.

44. The method of claim 43, wherein the at least one treatment agent is a mutual solvent and, optionally, further comprises at least one member selected from the group consisting acid, brine, diesel fuel and water.

45. The method of claim 42, wherein the acid stage contains an emulsified acid.

46. The method of claim 45, wherein the emulsified acid is an oil-external emulsion.

47. The method of claim 42, wherein the fluid introduced into the formation is gelled.

48. A method of stimulating a subterranean formation penetrated by a well with a diverting agent, the process comprising:
(A.) introducing into a high permeability zone of the formation a fluid comprising (i.) an amidoamine oxide gelling agent and (ii.) an acid, wherein the amidoamine oxide gelling agent is of the formula:

wherein $R_1$ is a saturated or unsaturated, straight or branched chain aliphatic group of from about 7 to about 30 carbon atoms, $R_2$ is a straight chain or branched, substituted or unsubstituted divalent alkylene group of from 2 to about 6 carbon atoms, $R_3$ and $R_4$ are independently selected from alkyl or hydroxyalkyl groups of from 1 to about 4 carbon atoms or $R_3$ and $R_4$ together with the nitrogen atom to which these groups are bonded form a heterocyclic ring of up to 6 members; and $R_5$ is hydrogen or a $C_1$-$C_4$ alkyl or hydroxyalkyl group;
(B.) increasing the viscosity of the fluid in the formation by spending the acid; and
(C.) subsequently introducing acid into the well, the flow of the subsequently introduced acid being diverted to a low permeability portion of the formation wherein the amidoamine oxide gelling agent comprises amidoamine oxide neat or amidoamine oxide in a nonaqueous solvent.

49. The method of claim 48, wherein the viscosity of the fluid is increased from the spending of between from about 20 to about 28% by weight of acid.

50. The method of claim 48, wherein at least one of the following additional stages is introduced into the well prior to and/or subsequent to (A.):
(a.) water;
(b.) nitrogen or carbon dioxide gas; or
(c.) mutual solvent optionally with acid, brine, diesel fuel or water.

51. The method of claim 48, wherein the subsequently introduced acid is an emulsified acid.

* * * * *

UNITED STATES PATENT AND TRADEMARK OFFICE
CERTIFICATE OF CORRECTION

| | | |
|---|---|---|
| PATENT NO. | : 7,303,018 B2 | Page 1 of 1 |
| APPLICATION NO. | : 10/888494 | |
| DATED | : December 4, 2007 | |
| INVENTOR(S) | : Cawiezel et al. | |

It is certified that error appears in the above-identified patent and that said Letters Patent is hereby corrected as shown below:

Column 15, line 58, replace "fawn" with --foam--

Signed and Sealed this

Seventeenth Day of June, 2008

JON W. DUDAS
*Director of the United States Patent and Trademark Office*